United States Patent
Galarza et al.

(10) Patent No.: US 6,947,876 B1
(45) Date of Patent: Sep. 20, 2005

(54) METHOD FOR AUTOMATED SYSTEM IDENTIFICATION

(75) Inventors: Cecilia Galarza, San Francisco, CA (US); Dan Hernandez, San Jose, CA (US); Mark Erickson, San Bruno, CA (US)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 09/523,065

(22) Filed: Mar. 10, 2000

Related U.S. Application Data

(60) Provisional application No. 60/165,400, filed on Nov. 11, 1999.

(51) Int. Cl.[7] ............................ G06F 17/10; G06F 7/48; G05B 13/02
(52) U.S. Cl. ................................ 703/2; 703/6; 700/30; 700/33; 700/29; 700/28; 700/44; 700/45
(58) Field of Search .......................... 703/2, 6; 700/28, 700/29, 30, 33, 44, 45

(56) References Cited

U.S. PATENT DOCUMENTS

| | | | | |
|---|---|---|---|---|
| 5,115,391 A | * | 5/1992 | Puthenpura et al. | 700/32 |
| 5,426,618 A | * | 6/1995 | Chen et al. | 367/42 |
| 5,629,845 A | * | 5/1997 | Liniger | 700/67 |
| 5,993,345 A | * | 11/1999 | Mott | 474/202 |
| 6,047,221 A | * | 4/2000 | Piche et al. | 700/44 |

OTHER PUBLICATIONS

Amish Mehta, Howard Kaufman, R. Ravi, "Turbine System Indentification: Experimental Results", IEEE 1994, pp. 3593–3595.*

Arnold Buss, "System Identification Using Frequency Domain Methodolgy", Proceedings of the 1990 Winter Simulation Conference, pp. 360–363.*

Peter A.J. Nagy, Lennart Ljung; "An Intelligent Tool for System Identification", IEEE 1989, pp. 58–63.*

Mark S. Basel, Michael B. Steer and Paul D. Franzon, "Hierarchical Simulation of High Speed Digital Interconnects Using a Package Simulator", IEEE 1994, pp. 81–87.*

Lennart Ljung, "Issues in System Identification" IEEE 1991, pp. 25–29.*

Lennart Ljung, "Convergence Analysis of Parametric Identification Methods", IEEE 1978, pp. 770–783.*

Yucai Zhu and Xiaohong Ge, "*Tai–Ji ID Automated Closed–Loop Identification Package for Model Based Process Control*", Hageheldlaan 62, NL–5641 GP Eindhoven, The Netherlands, pp. 1–7.

* cited by examiner

*Primary Examiner*—Kevin J. Teska
*Assistant Examiner*—Dwin M. Craig
(74) *Attorney, Agent, or Firm*—Wood, Herron & Evans, L.L.P.

(57) ABSTRACT

A method for automated system identification of a linear system is disclosed. A model structure is selected and one or more reference signal values are generated for input into the system. Input signal values and output signal values are retrieved from the system and system identification is performed on the model structure using the input signal values, the output signal values, and the one or more reference signal values. A point model, obtained as a result of the system identification, is then verified for accuracy.

108 Claims, 5 Drawing Sheets

METHOD FOR AUTOMATED SYSTEM IDENTIFICATION

This application claims the benefit of U.S. Provisional Application No. 60/165,400, filed Nov. 11, 1999.

FIELD OF THE INVENTION

The present invention relates generally to system identification and, more particularly, to a method for automated system identification of dynamic systems.

BACKGROUND OF THE INVENTION

The design and manufacture of new products has become an increasingly complex activity due to the high performance required by the users of such products. Therefore, many products are designed to incorporate high performance signal processing and/or control schemes. The methods used in designing high performance signal processing and/or control schemes require mathematical models of the systems under consideration. Control and signal processing engineers construct these mathematical models using established modeling methods.

One family of methods for constructing models is known as system identification. In order to use system identification methods, system designers must rely on data gathered from experiments conducted on the system under consideration, as well as on prior knowledge of the behavior of the system. Most system identification methods are iterative and seek to improve model accuracy through repeated experiments and numerical computations. The resulting accurate models can be used to design high performance signal processing and/or control schemes for the systems under consideration.

An example where system identification is used is in communication systems. A key component of any analog or digital communication system is a communications channel. The communications channel is the medium through which a signal is transmitted and received. For a Digital Subscriber Line (DSL), the channel may include the analog transmitter electronics, the copper wiring that connects the central office and the customer modem, and the analog receiver electronics. For a wireless communications system, the channel may include the analog transmitter electronics, transmitting antenna, electromagnetic propagation to the receiving antenna, the receiving antenna itself, and analog receiver electronics. Accurate channel models play a critical role in analyzing and designing communications systems.

Several system identification methods are available to system designers. Many of these methods are encoded in existing system identification software tools. A typical example of a system identification tool is MATLAB® System Identification Toolbox, available from Mathworks, Inc., Natick, Mass., which is a state-of-the-art system identification package having a graphical user interface (GUI). To successfully use the MATLAB® System Identification Toolbox, the control system designer must interpret results and make numerous complex decisions in the areas of identification experiment design and refinement, experimental data quality analysis, and model quality analysis. These system identification tools thus require experienced users with specific expertise in system identification theory. In addition, these methods leave the construction and refinement of system identification experiments up to the user.

Therefore, what is needed is a tool for the identification of dynamic systems that automates the entire identification process. Further, the tool should require little or no specific knowledge of system identification theory from the control system designer who uses it.

SUMMARY OF THE INVENTION

A method for automated system identification is disclosed. A model structure is selected and reference signal values are generated for input into the system. Input signal values and output signal values are retrieved from the system and system identification is performed on the model structure using the input signal values, the output signal values, and the reference signal values. A point model, obtained as a result of the system identification, is then verified for accuracy.

Other features and advantages of the present invention will be apparent from the accompanying drawings, and from the detailed description, which follow below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
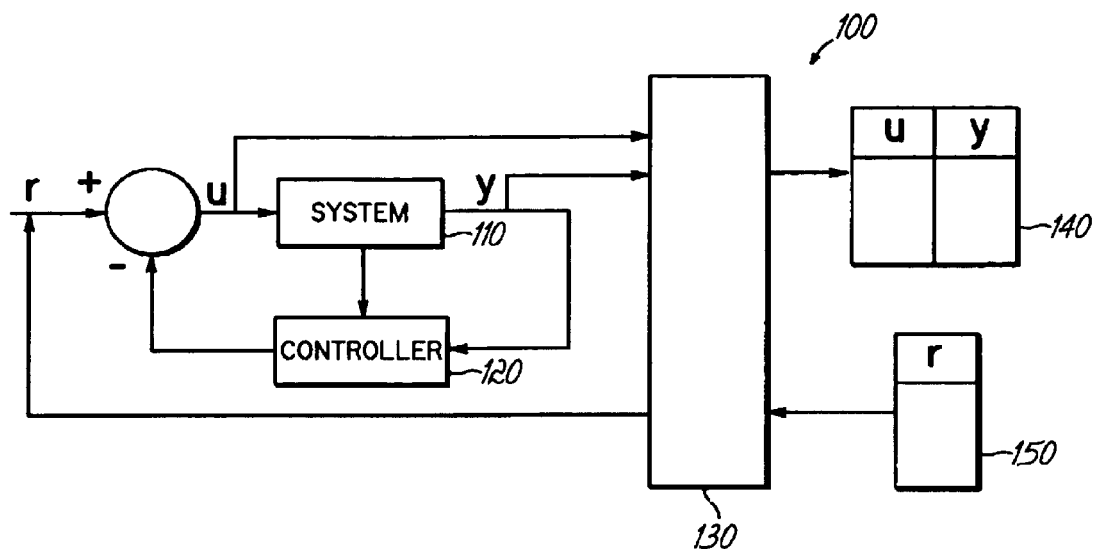
FIG. 1 shows an exemplary dosed loop data acquisition system architecture.

A method for automated system identification is described. In the following description, for purposes of explanation, numerous specific details are set forth in order to provide a thorough understanding of the present invention. It will be evident, however, to one skilled in the art that the present invention may be practiced without these specific details.

In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMS, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

FIG. 1 shows an exemplary closed loop data acquisition system architecture 100. In one embodiment, the present invention is described in connection with closed loop system identification. Alternatively, the present invention may be implemented with open loop system identification. However, closed loop system identification should be used when the system to be identified is unstable.

Referring to FIG. 1, a system 110 is instrumented to provide injection of a reference signal r and automatic collection of input signals u and output signals y. In one embodiment, the reference signal r, also known as excitation signal or reference trajectory, is injected at the input of system 110. Alternatively, the reference signal r may be injected at the output of system 110. The distinction between reference signal r and input signal u is provided for closed loop identification purposes. In one embodiment, the reference signal r resides in a table or data file 150 and is injected using a computer interface 130. Conversely, input signals u and output signals y are collected and stored in a separate table or data file 140 using the same computer interface 130. In this embodiment, the controller 120 is provided to control the system 110.

Figure 2:
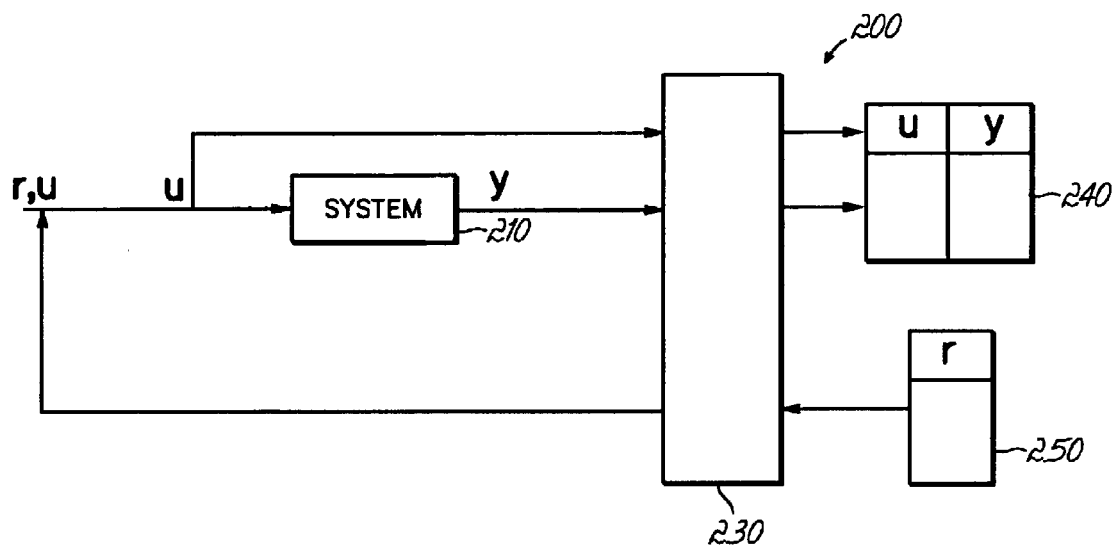
FIG. 2 shows an exemplary open loop data acquisition system architecture.

FIG. 2 shows an exemplary open loop data acquisition system architecture 200. Referring to FIG. 2, a system 210 is instrumented to provide injection of a reference signal r and automatic collection of input signals u and output signals y. In one embodiment, the reference signal r is injected at the input of system 210. In contrast to closed loop identification, in the case of open loop identification, the reference signal r and the input signal u are identical. In one embodiment, the reference signal r resides in a table or data file 250 and is injected using a computer interface 230. Conversely, input signals u and output signals y are collected and stored in a separate table or data file 240 using the same computer interface 230.

Figure 3:
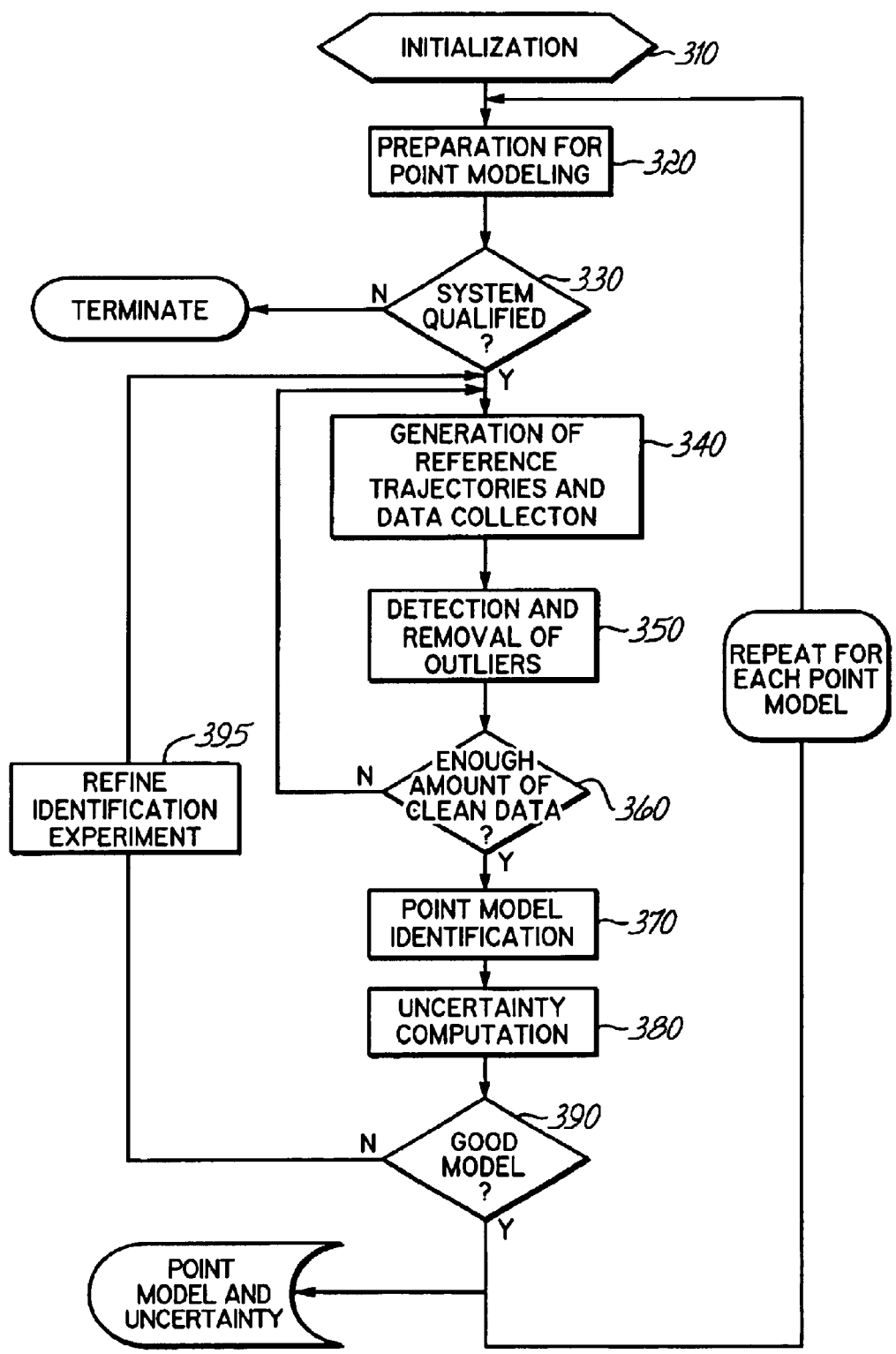
FIG. 3 is a flowchart representing the method for automated system identification.

FIG. 3 is a flowchart representing one embodiment of the method for automated system identification of linear systems. According to one embodiment, a system user or designer specifies a list of operating conditions. For example, in the case of identification of a disk drive, the user may specify a temperature, a vibration condition, a track number, a surface number, and a drive number. The user may also provide information about the sampling frequency and the desired frequency bandwidth covered by a prospective model.

Figure 4:
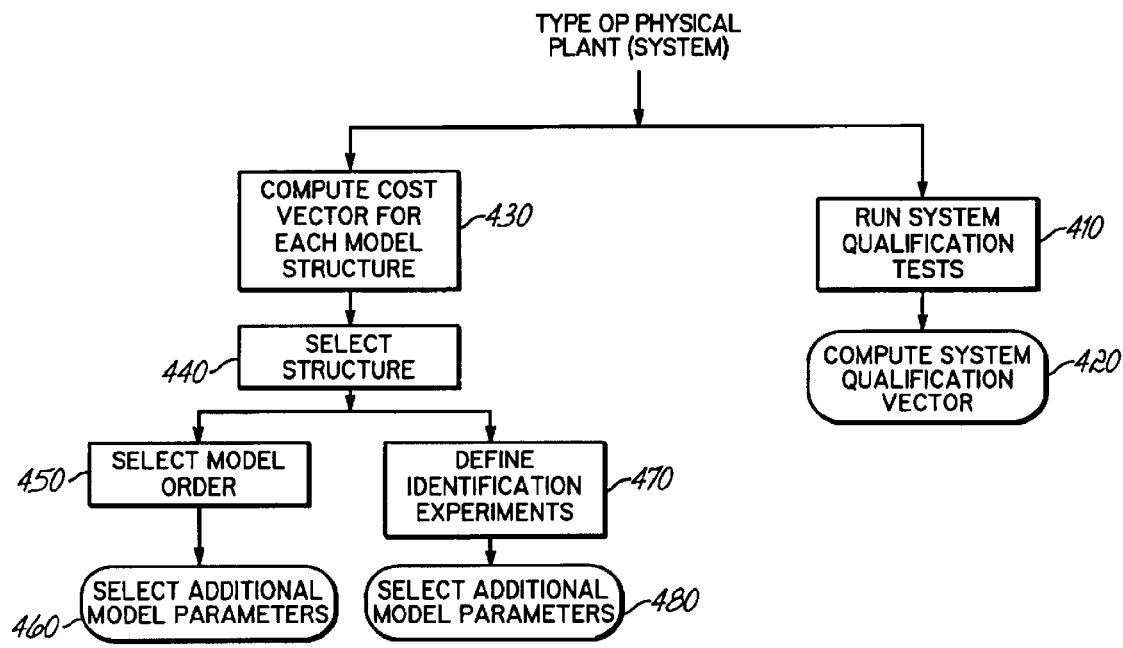
FIG. 4 is a flowchart representing one embodiment of the process of preparation for point modeling.

Referring to FIG. 3, at step 310, a list of point models to be identified is constructed from the list of operating conditions provided by the user. At step 320, during preparation for point modeling, each model is set up as described in detail below and as illustrated in FIG. 4.

Subsequent to the preparation for point modeling, a decision is made at step 330 concerning the qualification of the system. If the system is qualified, based on system qualification tests described below in connection with FIG. 4, then reference trajectories are generated and data is collected at step 340. If the system is not qualified, then the procedure is terminated.

At step 340, reference signals or trajectories are generated and data is collected as described in further detail below in connection with FIG. 5.

At step 350, outliers are detected and subsequently cleaned or removed. One embodiment of the process of detection and removal of outliers is described in further detail below in connection with FIG. 6.

Next, a decision is made at step 360 whether a sufficient amount of clean data is available for further processing. If the removal of outliers was successful, but the number of removed values exceeds a predetermined percentage of the number of stored output signal values, data is discarded and steps 340 and 350 are repeated. Once sufficient clean data is available, point model identification is performed at step 370. One embodiment of the point model identification procedure will be described in further detail below.

At step 380, uncertainty coefficients are computed, wherein the coefficients correspond to transfer functions identified during the point model identification performed at step 370.

At step 390, a decision is made whether the model obtained is accurate. In one embodiment, a model qualification procedure is performed. One embodiment of the model qualification procedure will be described in further detail below in connection with FIG. 7.

Finally, a refinement of the identification experiment is performed at step 395. Once the model is assessed as accurate at step 390, the entire process is repeated for each point model in the point model list.

In alternate embodiments, the order of the steps to be performed may be modified without departing from the scope of the present invention. Similarly, it is to be understood by a person of ordinary skill in the art that some steps may be eliminated or made available as optional features.

In one embodiment, the present invention is implemented in connection with a supervisory decision entity, which is periodically called to make complex decisions and interpret results of different steps of the method shown in the flowchart of FIG. 3. In one embodiment, the decision entity is a Real-Time Planner (not shown). The Real-Time Planner is described in detail in U.S. patent application Ser. No. 09/345,172, filed Jun. 30, 1999, entitled Real-Time Planner for Design, to Sunil C. Shah, Pradeep Pandey, Thorkell Gudmundsson, and Mark Erickson, and assigned to Voyan Technology Corporation of Santa Clara, Calif. Alternatively, another software application may be provided to make the required complex decisions. In another alternate embodiment, the user may interpret the results and make supervisory decisions.

Preparation for Point Modeling

The preparation for point modeling and model setup performed at step 320 in FIG. 3 will now be described in further detail. FIG. 4 is a flowchart representing one embodiment of the process of preparation for point modeling. Referring to FIG. 4, once the user specifies the list of operating conditions, system qualification tests are run at step 410.

In one embodiment, a test is run to assess if the system satisfies the linearity assumptions. Particularly for the closed loop identification illustrated at in FIG. 1, the test may verify that the controller 120 is not introducing undesirable non-linearities. For example, a first reference signal r is initially injected. Subsequently, a second version of it, scaled by a predetermined factor, is also injected. If the closed loop system 100 is linear, the resulting output signals y must be scaled by the same factor. Alternatively, other qualification tests may be run, for example a quick reference trajectory improvement may be performed, and predicted and actual output signals y may be subsequently compared. In FIG. 4, at step 420, a system qualification cost vector is computed as a result of the system qualification tests. The cost vector is further used to decide whether the system qualifies for application of the method.

Generally, the present invention may be implemented with any linear model structure. A list of linear model structures is presented in L. Ljung, *System Identification for the User*, Prentice Hall, 1999. Bias of the model should be taken into consideration when selecting an appropriate model structure. Biased models may arise when the model structure is not sufficiently rich or when a cost function associated with the model structure does not have a unique global minimum and, instead, presents several local minima. Model structures that may be used for identification include finite impulse response (FIR), autoregressive with external input (ARX), autoregressive moving average with external input (ARMAX), autoregressive moving average (ARMA), autoregressive autoregressive with external input (ARARX), autoregressive autoregressive moving average with external input (ARARMAX), output error (OE), Box-Jenkins (BJ), and Ordinary Differential Equations (ODE).

As shown in the flowchart of FIG. 4, at step 430 a cost vector is simultaneously computed for each available model structure. A model structure is subsequently selected at step 440 based on the computed cost vector.

Each known model structure has an associated cost vector, which can be computed based on several cost variables. Among the cost variables to be considered in the process of computing the cost vector are: a risk of local minima factor (r.l.m.), which depends on the type of system or physical plant; a computational cost factor (c.c.), which is a characteristic of the particular model structure; and an equipment time factor (e.t.), which is related to the number of identification experiments necessary to obtain accurate models. In one embodiment, the cost vector is passed to the real-time planner, which selects the appropriate model structure. Alternatively, the designer may select the model structure based on the calculated cost vector.

Referring to FIG. 4, once the model structure is selected at step 440, a model order is selected at step 450. Additional model parameters, such as an input signal delay or a disturbance model order, are selected at step 460. The model order selection is performed following the procedure described in detail in U.S. patent application Ser. No. 09/345,640, filed Jun. 30, 1999, entitled Model Error Bounds for Identification of Stochastic Models for Control Design, to Sunil C. Shah, and assigned to Voyan Technology Corporation of Santa Clara, Calif. The selected model order may be revised according to the outcome of model qualification tests described in further detail below.

At the same time, identification experiments are defined at step 470 and experimental parameters are obtained at step 480. In one embodiment, one or more operating conditions are specified for the model structure selected. At the same time, a sampling frequency and a frequency bandwidth covered by the model structure are also provided. The identification experiments are then defined based on the operating conditions, the sampling frequency, and the frequency bandwidth of the model structure.

In one embodiment, the system identification of a point model can be performed subsequent to one or more identification experiments, depending on the number of input signals u and output signals y, as well as on the experimental setup available and the length of data required by the model structure to obtain an accurate model. In the embodiment shown in FIG. 1, table or data file 150 contains the reference signal r, also known as excitation signal or reference trajectory. Data collected during the identification experiment, such as input signals u and output signals y, is stored in table or data file 140. System input and output identifiers, as well as any other experiment-specific parameters, may be stored in a separate table or data file (not shown). Finally, a header file may store the plant input and output identifiers, as well as other experiment-specific parameters.

A quiet run is defined as an identification experiment having a table or data file 150 containing a null reference signal r. Similarly, an excited run corresponds to an identification experiment having a non-zero excitation signal r. In one embodiment, an identification experiment corresponding to an excited run contains information on a predetermined frequency region only. As a result, the total frequency bandwidth, initially specified by the user, is separated into several excited runs according to the maximum duration of each identification experiment.

Qualification of the System

Subsequent to the preparation for point modeling, a decision is made concerning the qualification of the system performed at step 330 in FIG. 3. In one embodiment, the real-time planner decides whether the system is qualified or not. Alternatively, the decision may be made by another software application or by the system designer. If the system qualifies, then reference trajectories are generated and data is collected. If the system does not qualify, then the procedure is terminated.

Generation of Reference Trajectories and Data Collection

The generation of reference signals or trajectories and data collection, performed at step 340 in FIG. 3, will now be described in further detail. FIG. 5 is a flowchart representing one embodiment of the process of generation of reference trajectories and data collection.

Figure 5:
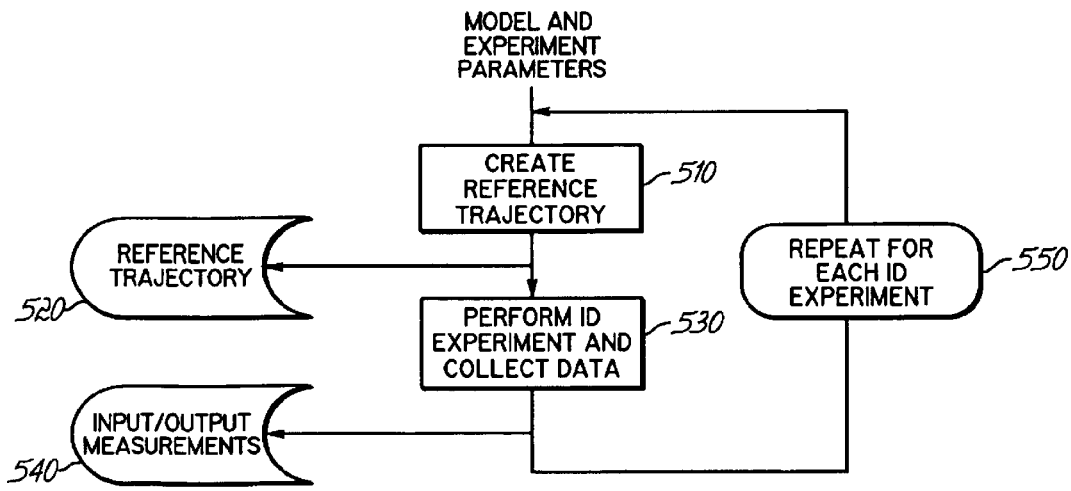
FIG. 5 is a flowchart representing one embodiment of the process of generation of reference trajectories and data collection.

As illustrated in the flowchart of FIG. 5, the model parameters and the experimental parameters, obtained at steps 450, 460 and 480 shown in FIG. 4, are used to create reference signals r at step 510. In one embodiment, this step creates tables or data files 140 and 150 containing data corresponding to all identification experiments for a point model. In order to create a reference signal or trajectory r, a large output signal-to-noise ratio must be obtained and linear operation regime must be guaranteed for the point model.

In one embodiment, chirp signals may be used as reference signals. In this embodiment, the envelope of an output signal is retrieved and divided by the envelope of a corresponding chirp signal in order to estimate an input/output gain. Subsequently, to obtain a new chirp signal envelope, a desired output level is divided by the calculated input/output gain. The resulting chirp signal is conditioned to account for possible non-linear effects, such as system-input saturation and system-input slew-rate limits.

Alternatively, other signals may be used as reference signals, such as pseudo-random binary sequence signals, a sum of sinusoids, or wavelets. The creation of reference trajectories is disclosed in further detail in U.S. patent application Ser. No. 09/345,640, filed Jun. 30, 1999, entitled Model Error Bounds for Identification of Stochastic Models for Control Design, to Sunil C. Shah, and assigned to Voyan Technology Corporation of Santa Clara, Calif. The reference signals are stored in table or data file 150 at step 520.

As shown in the flowchart of FIG. 5, identification experiments are performed at step 530. The chirp signal is injected into the system 110 and, as a result, the input signals u and output signals y are collected and stored in table or data file 140 at step 540. The process of generation of reference trajectories and collection of data is iterative. At step 550, the procedure is repeated for each identification experiment and results are collected and stored in respective tables or data files.

Detection and Removal of Outliers

Figure 6:
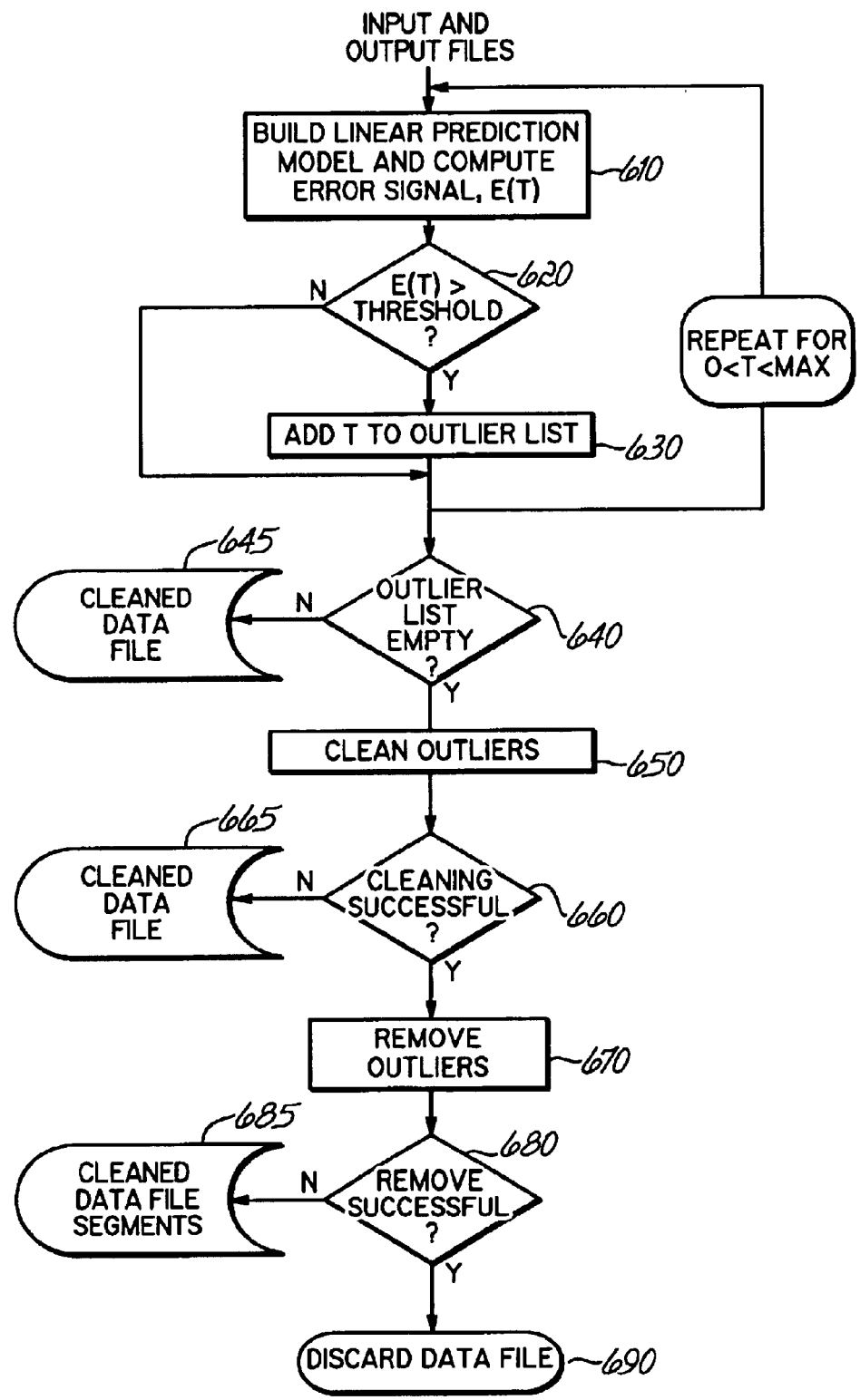
FIG. 6 is a flowchart representing one embodiment of the process of detection and removal of outliers.

One embodiment of the detection and removal of outliers performed at step 350 in FIG. 3 will now be described in further detail. FIG. 6 is a flowchart representing one embodiment of the process of detection and removal of outliers.

As a result of possible malfunctions in sensors or in the data acquisition system, experimental data may have outliers. Outliers are defined as input/output pairs of signals that do not correspond to normal operation of the system 110 of FIG. 1. For example, with respect to a disk drive, errors in the gray code or in the servo burst readings may generate erroneous sensor readings in the position error signal (PES).

Outliers are identified using a linear prediction or smoothing filter. The linear filter is based on a linear model of a low order. As shown in the flowchart of FIG. 6, at step 610, the linear model is constructed and an error signal e(t) is computed as a difference between a predicted output signal value corresponding to the linear and the stored output signal y value obtained from the identification experiment. At step 620, a decision is made whether e(t) is greater than a predetermined threshold. In one embodiment, the real-time planner automatically decides whether e(t) is greater than the threshold. Alternatively, the decision may be made by another software application or by the system designer. If e(t) is greater than the threshold, then the output signal y is declared an outlier, and its value at time t, namely y(t), is stored in an outlier list at step 630. The outlier detection process is iterative for various time values between zero and $t_{max}$. If e(t) is lower than the threshold, then steps 620 and 630 are repeated for a different time value.

The content of the outlier list is verified at step 640. If the outlier list is empty, the data is considered clean at step 645. If the outlier list is not empty, outliers are cleaned at step 650. The cleaning procedure is used when outliers are rare. During cleaning, measured data is replaced at step 650 by the predicted output signal value corresponding to the same time value t. At step 660, a decision is made whether the cleaning procedure was successful. In one embodiment, the decision is based on a new linear prediction or smoothing filter constructed from the clean data. If the cleaning was successful, data is considered clean at step 665. Otherwise, outliers are removed at step 670.

The removal procedure typically occurs when outliers are grouped in clusters and replacement with predicted output values is not possible. At step 670, data is removed and the identification experiment is split at the removal point. At step 680, a decision is made whether the removal procedure was successful. In one embodiment, the decision is based on a new linear prediction or smoothing filter constructed from the remaining clean data. If the removal was successful, data is considered clean at step 685. Otherwise, the entire set of measured data is discarded at step 690.

Amount of Clean Data

Subsequent to the detection and removal of outliers, at step 360 in FIG. 3, a decision is made whether a sufficient amount of clean data is available for further processing. In one embodiment, the real-time planner automatically decides whether the resulting clean data is sufficient for further processing. Alternatively, the decision may be made by another software application or by a system designer. If the removal was successful, but the number of removed values exceeds a predetermined percentage of the stored output signal values, the data is discarded. As a result, the generation of reference trajectories and data collection and the detection and removal of outliers are repeated using a new set of data. If sufficient clean data is available, point model identification is performed.

Point Model Identification

The point model identification procedure, shown at step 370 in FIG. 3, will now be described in further detail.

In one embodiment, two multi-input multi-output (MIMO) models describe each point model. These two MIMO models are an input/output model represented by a transfer function matrix G and a disturbance model represented by a transfer function matrix H. If the system is subject to periodic disturbances, a third MIMO model may be identified using fictitious sinusoidal input signals, as described in U.S. patent application Ser. No. 09/345,166, filed Jun. 30, 1999, entitled Adaptation to Unmeasured Variables, to Sunil C. Shah, and assigned to Voyan Technology Corporation of Santa Clara, Calif.

In one embodiment, the input/output model and the disturbance model are simultaneously identified from the clean data that results from step 360 in FIG. 3. Alternatively, the disturbance transfer function that best explains the data is determined using a previously provided input/output model. In one embodiment, the user provides the input/output model. Alternatively, the input/output model may be obtained from previous identification experiments. The identification of the disturbance model using a stable input/output model is known and has been described in L. Ljung, *System Identification for the User*, Prentice Hall, 1999. However, this procedure requires the implementation of a filter that contains all the modes of the input/output model. When this model is unstable, the filter cannot be implemented, because it will contain the unstable modes of the input/output model. A method which circumvents this obstacle and enables the identification of disturbance models when the input/output model is unstable will be described in detail below.

Let u(t) and y(t) be the input and output signals to a linear system M. Then, the linear system M is characterized by the following expression:

$$M: y(t)=G(q)u(t)+H(q)e(t)$$

where G and H are linear transfer functions, e(t) is a unit covariance white noise signal, t is the sample index, and q is a delay operator. Transfer function G relates to the input/output model, while transfer function H corresponds to the disturbance model. If G is unstable, then it can be factored as a product of two transfer functions:

$$G(q)=G_u^{-1}(q)G_s(q)$$

where $G_u^{-1}$ includes all the unstable modes of G, $G_s$ includes all the stable modes of G, and both $G_u$ and $G_s$ are stable transfer functions.

Following standard system identification procedures, the prediction error associated with the above y(t) expression is computed as follows:

$$e(t)=H^{-1}[y(t)-G(q)u(t)]=H^{-1}v$$

Since G is known, then all components of signal v are known. However, because G is unstable, v cannot be computed using the above equation. Therefore, the two stable transfer functions $G_u$ and $G_s$ must be used in the computation as follows:

$$e(t) = H^{-1}[y(t) - G_u^{-1}(q)G_s(q)u(t)]$$
$$= H^{-1}G_u^{-1}[G_u y(t) - G_s(q)u(t)]$$
$$= \tilde{H}^{-1}\tilde{v}$$

where $\tilde{H} = G_u H$ and $\tilde{v} = G_u y(t) - G_s(q)u(t)$.

The above equation represents a system with no control or external input. Typically, these systems are described by either an AR model structure or an ARMA model structure depending on the parameterization chosen for $\tilde{H}$.

Let p be the number of output signals and r the number of input signals. The signal $\tilde{v}=G_u y(t)-G_s(q)u(t)$ is computed based on $G_u$ and $G_s$. $\tilde{H}$ is then obtained considering an AR model structure or an ARMA model structure.

1. Using an AR model structure: $A_1, \ldots, A_n$, are identified, where $A_i \in \Re^{P \times P}$, such that $$\tilde{v}(t) = e(t) - A_1\tilde{v}(t-1) - \ldots - A_n\tilde{v}(t-n)$$
    $$= e(t) - [A_1 \ldots A_n]\begin{bmatrix} \tilde{v}(t-1) \\ \vdots \\ \tilde{v}(t-n) \end{bmatrix}$$

The above equation is solved for matrices $A_i$, i=1, ..., n, using a known least squares (LS) algorithm. The resulting transfer function is $$\tilde{H}(q)=[1+A_1 q^{-1}+ \ldots +A_n q^{-n}]^{-1}$$

2. ARMA model: Identify $A_1, \ldots, A_n$ and $B_0 \ldots, B_m$, where $A_i \in \Re^{P \times P}$ and $B_i \in \Re^{P \times P}$, such that $$\tilde{v}(t)=B_0 e(t)+ \ldots +B_m e(t-m)-A_1\tilde{v}(t-1)- \ldots -A_n\tilde{v}(t-n)$$

The ARMA model is obtained after an iterative procedure that minimizes the following cost function $$V(\theta) := \frac{1}{N}\sum_i \|e(t)\|^2 = \frac{1}{N}\sum_t \sum_{i=1}^{p} e_i^2(t)$$

where p is the number of outputs of the MIMO system, and $\theta=[A_1 \ldots A_n B_0 \ldots B_m]$. The resulting transfer function is $$\tilde{H}(q)=[1+A_1 q^{-1}+ \ldots +A_n q^{-n}]^{-1}[B_0+ \ldots +B_m q^{-m}]$$

Finally, the disturbance model is reconstructed as $H=G_u^{-1}\tilde{H}$.

Uncertainty Computation

Subsequent to point model identification, uncertainty bounds corresponding to each of the transfer functions G and H introduced above are computed. One embodiment of the computation of the uncertainty bounds has been described in detail in U.S. patent application Ser. No. 09/345,640, filed Jun. 30, 1999, entitled Model Error Bounds for Identification of Stochastic Models for Control Design, to Sunil C. Shah, and assigned to Voyan Technology Corporation of Santa Clara, Calif.

Model Qualification

Subsequent to the uncertainty computation, a decision is made whether the model obtained is accurate. In one embodiment, a model qualification procedure is performed and the real-time planner evaluates the accuracy of the model. Alternatively, the decision may be made by another software application. In another alternate embodiment, a system designer may decide whether the model is accurate or not. One embodiment of the model qualification procedure will now be described in further detail.

Figure 7:
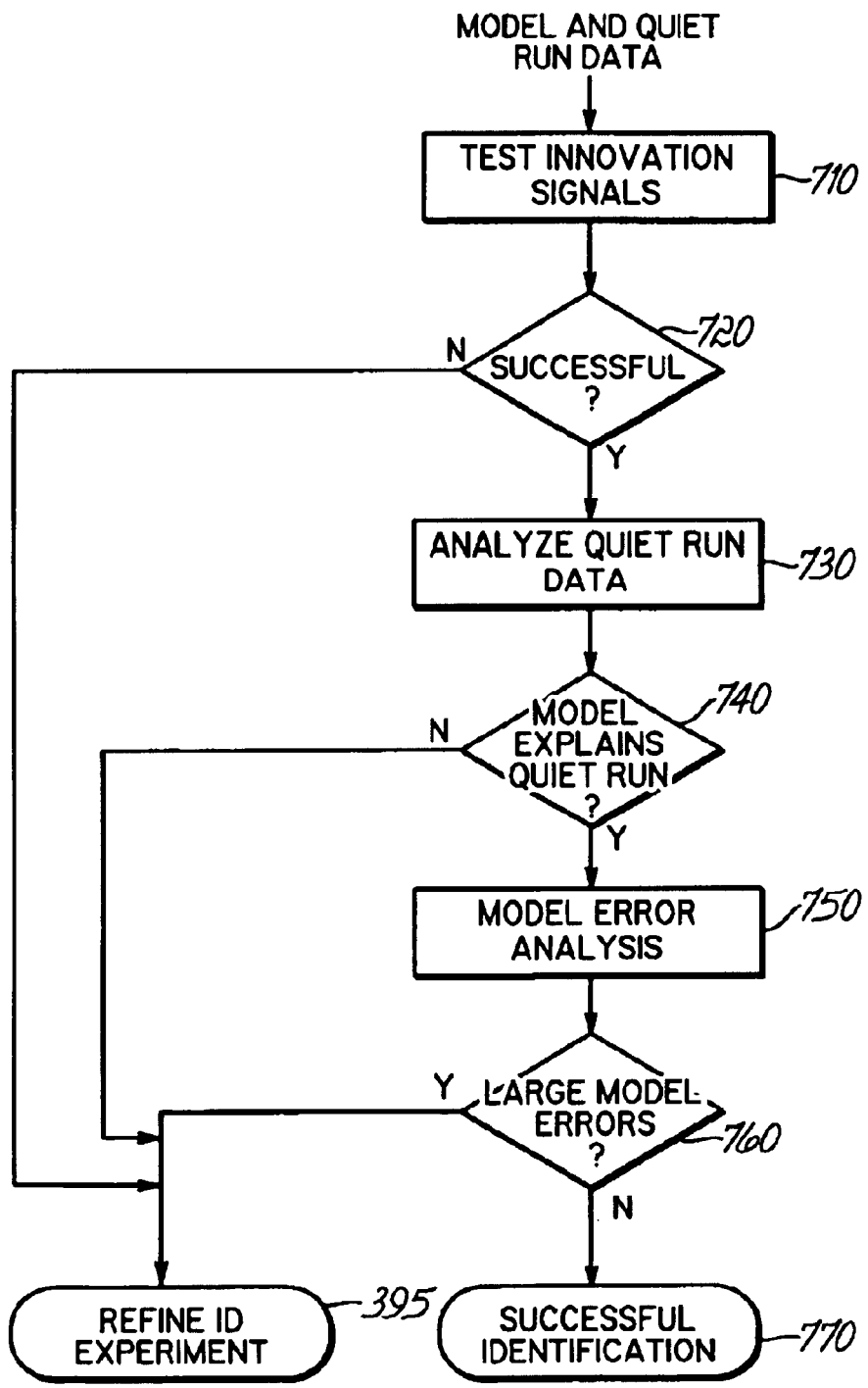
FIG. 7 is a flowchart representing one embodiment of the process of verification of the model accuracy.

FIG. 7 is a flowchart representing one embodiment of the model qualification procedure, i.e. a process of verification of the model accuracy. Referring to FIG. 7, several tests are performed in order to qualify the model. In one embodiment, the real-time planner makes decisions related to the test results and the accuracy of the model. Alternatively, the system designer may decide whether the test results show that the model is accurate.

An analysis of the statistical properties of innovation signals is performed at step 710. If the innovation signals are white stochastic signals, (uncorrelated with past measurements), then the model is accurate. This model test is described in L. Ljung, *System Identification for the User*, Prentice Hall, 1999. At step 720, a decision is made whether the test performed at step 710 was successful. If the test was successful, quiet run data is analyzed at step 730. If the test was not successful, then the identification experiment must be refined at step 395.

The analysis of data collected during the quiet run is performed at step 730. Frequency domain identification techniques are not consistent for closed loop identification. However, the accuracy of the model obtained can be qualified by comparing it with a transfer function estimate, computed as a ratio of system input and system output spectral estimates. Specifically, the spectral estimates obtained from quiet run are used to avoid confusion with the spectral modes injected by the reference signal in the excited run. The closed loop system is assumed to be excited by large disturbances. At step 740, a decision is made whether the model explains the quiet run data. If prominent features observed in the spectral estimates obtained from the quiet run are present in the model, then the model is considered accurate and it is said that the model explains the quiet run data. If not, the identification experiment must be refined at step 395 and the model order has to be increased in order to account for system dynamics not captured by the model.

If the model explains the quiet run data, then analysis of model error bounds is performed at step 750. Frequency regions corresponding to large model errors are detected and analyzed. If such frequency regions can be detected at step 760, then the identification experiment must be refined at step 395 and the reference signal may be modified by increasing the sweep time corresponding to those frequency regions. If such frequency regions cannot be detected, then the identification is considered successful at step 770.

Refinement of Identification Experiment

Finally, subsequent to model qualification, the refinement of the identification experiment is performed at step 395 in FIG. 3. In one embodiment, the main variables available for refinement are the model order, the total time length of experimental data, i.e. the number of identification experiments, and the excitation signal. In one embodiment, the cost needed by the real-time planner to make a decision is computed. For example, performing new experiments has a high equipment time cost, while increasing the order of the model results in an increase in the total computational cost. The calculated costs are evaluated based on a priori estimates and data gathered in the steps described above.

In one embodiment, once the model is assessed as accurate, the entire process is repeated for each available point model in the point model list.

What is claimed is:

1. A method for automated system identification comprising:
   selecting a model structure;
   generating at least one reference signal for input into a system;
   retrieving a plurality of input signals and a plurality of output signals from said system;
   performing system identification on said model structure using said plurality of input signals, said plurality of output signals, and said at least one reference signal to obtain a point model;
   verifying accuracy of said point model; and
   said reference signal being generated to obtain a large output signal-to-noise ratio and to guarantee a linear operation regime for said point model.

2. The method according to claim 1, further comprising:
   calculating a cost vector for said model structure; and
   selecting a model order based on said cost vector associated with said model structure.

3. the method according to claim 2, wherein said model structure includes at least one model parameter.

4. The method according to claim 1, further comprising verifying linearity of said system and detecting no-linear manifestations of said system.

5. The method according to claim 1, further comprising storing said at least one reference signal into a reference table and storing said plurality of input signals and said plurality of output signals into an input/output table.

6. The method according to claim 1, wherein said model structure is selected from a group consisting of finite impulse response (FIR), autoregressive with external input (ARX), autoregressive moving average with external input (ARMAX), autoregressive moving average (ARMA), autoregressive autoregressive with external input (ARARX), autoregressive autoregressive moving average with external input (ARARMAX), output error (OE), Box-Jenkins (BJ), and Ordinary Differential Equations (ODE).

7. The method according to claim 1, wherein said reference signal is selected from a group consisting of a chirp signal, a pseudo random binary sequence, a sum of sinusoids, and a wavelet.

8. The method according to claim 1, wherein said performing further comprises identifying an input/output model and a disturbance model within said point model.

9. The method according to claim 8, wherein said input/output model is unstable and said disturbance model is determined using said input/output model.

10. A method for automated system identification comprising:
    selecting a model structure;
    generating at least one reference signal for input into a system;
    retrieving a plurality of input signals and a plurality of output signals from said system;
    performing system identification on said model structure using said plurality of input signals, said plurality of output signals, and said at least one reference signal to obtain a point model;

verifying accuracy of said point model;
providing at least one operating condition for said system;
providing a sampling frequency and a frequency bandwidth covered by said model structure; and
defining a plurality of identification experiments according to said at least one operating condition, said sampling frequency, and said frequency bandwidth.

11. The method according to claim 10, wherein said model structure includes a plurality of experimental parameters determined by said plurality of identification experiments.

12. The method according to claim 10, further comprising:
performing each identification experiment of said plurality of identification experiments in said system; and
obtaining said plurality of input signals and said plurality of output signals from said each identification experiment.

13. A method for automated system identification comprising:
selecting a model structure;
generating at least one reference signal for input into a system;
retrieving a plurality of input signals and a plurality of output signals from said system;
performing system identification on said model structure using said plurality of input signals, said plurality of output signals, and said at least one reference signal to obtain a point model;
verifying accuracy of said point model;
automatically detecting at least one outlier value in said plurality of output signals;
removing said at least one outlier value fro said plurality of output signals; and
replacing said at least one outlier value with a predetermined value calculated using a filter.

14. A method for automated system identification comprising:
selecting a model structure;
generating at least one reference signal for input into a system;
retrieving a plurality of input signals and a plurality of output signals from said system;
performing system identification on said model structure using said plurality of input signals, said plurality of output signals, and said at least one reference signal to obtain a point model;
verifying accuracy of said point model;
automatically detecting at least one outlier value in said plurality of output signals;
removing said at least one outlier value fro said plurality of output signals;
wherein said detector further comprises:
building a filter using said plurality of input signals and said plurality of output signals,
computing said at least one outlier value using said filter,
comparing said at least one outlier value with a predetermined threshold value, and
storing said at least one outlier value if said at least one outlier value is greater than said predetermined threshold value.

15. The method according to claim 14, wherein said detecting requires a plurality of iterations, each iteration being related to a time value.

16. A method for automated system identification comprising:
selecting a model structure;
generating at least one reference signal for input into a system;
retrieving a plurality of input signals and a plurality of output signals from said system;
performing system identification on said model structure using said plurality of input signals, said plurality of output signals, and said at least one reference signal to obtain a point model;
verifying accuracy of said point model;
said performing further comprising identifying an input/output model and a disturbance model within said point model;
said input/output model being unstable and said disturbance model being determined using said input/output model;
calculating an input/output uncertainty parameter within said input/output model, and
calculating a disturbance uncertainty parameter within said disturbance model.

17. The method according to claim 16, wherein said verifying further comprises analyzing frequency regions corresponding to said input/output uncertainty parameters and said disturbance uncertainty parameter and modifying said at least one reference signal by increasing a sweep time corresponding to said frequency regions.

18. A method for automated system identification comprising:
selecting a model structure;
generating at least one reference signal for input into a system;
retrieving a plurality of input signals and a plurality of output signals from said system;
performing system identification on said model structure using said plurality of input signals, said plurality of output signals, and said at least one reference signal to obtain a point model;
verifying accuracy of said point model;
wherein said verifying further comprises analyzing whether a plurality of innovation signals, derived from said plurality of output signals, are white stochastic signals uncorrelated with past measurements.

19. A method for automated system identification comprising:
selecting a model structure;
generating at least one reference signal for input into a system;
retrieving a plurality of input signals and a plurality of output signals from said system;
performing system identification on said model structure using said plurality of input signals, said plurality of output signals, and said at least one reference signal to obtain a point model;
verifying accuracy of said point model;
calculating a cost vector for said model structure;
selecting a model order based on said cost vector associated with said model structure;

wherein said verifying further comprises:
analyzing said plurality of input signals and said plurality of output signals retrieved using a value of zero for said at least one reference signal, and
increasing said model order to account for unrepresented system dynamics.

20. A computer readable medium containing executable instructions which, when executed in a processing system, cause said system to perform a method for automated system identification comprising:
selecting a model structure;
generating at least one reference signal for input into a system;
retrieving a plurality of input signals and a plurality of output signals from said system;
performing system identification on said model structure using said plurality of input signals, said plurality of output signals, and said at least one reference signal to obtain a point model;
verifying accuracy of said point model;
calculating a cost vector for said model structure;
selecting a model order based on said cost vector associated with said model structure; and
said model structure including at least one model parameter.

21. The computer readable medium according to claim 20, wherein said method further comprises verifying linearity of said system and detecting non-linear manifestations of said system.

22. The computer readable medium according to claim 20, wherein said method further comprises storing said at least one reference signal into a reference table and storing said plurality of input signals and said plurality of output signals into an input/output table.

23. The computer readable medium according to claim 20, wherein said model structure is selected from a group consisting of finite impulse response (FIR), autoregressive with external input (ARX), autoregressive moving average with external input (ARMAX), autoregressive moving average (ARMA), autoregressive autoregressive with external input (ARARX), autoregressive autoregressive moving average with external input (ARARMAX), output error (OE), Box-Jenkins (BJ), and Ordinary Differential Equations (ODE).

24. A computer readable medium containing executable instructions which, when executed in a processing system, cause said system to perform a method for automated system identification comprising:
selecting a model structure;
generating at least one reference signal for input into a system;
retrieving a plurality of input signals and a plurality of output signals from said system;
performing system identification on said model structure using said plurality of input signals, said plurality of output signals, and said at least one reference signal to obtain a point model;
verifying accuracy of said point model;
providing at least one operating condition for said system;
providing a sampling frequency and a frequency bandwidth covered by said model structure; and
defining a plurality of identification experiments according to said at least one operating condition, said sampling frequency, and said frequency bandwidth.

25. The computer readable medium according to claim 24, wherein said model structure includes a plurality of experimental parameters determined by said plurality of identification experiments.

26. The computer readable medium according to claim 24, wherein said method further comprises:
performing each identification experiment of said plurality of identification experiments in said system; and
obtaining said plurality of input signals and said plurality of output signals from said each identification experiment.

27. A computer readable medium containing executable instructions which, when executed in a processing system, cause said system to perform a method for automated system identification comprising:
selecting a model structure;
generating at least one reference signal for input into a system;
retrieving a plurality of input signals and a plurality of output signals from said system;
performing system identification on said model structure using said plurality of input signals, said plurality of output signals, and said at least one reference signal to obtain a point model;
verifying accuracy of said point model;
said reference signal being selected from a group consisting of a chirp signal, a pseudo random binary sequence, a sum of sinusoids, and a wavelet.

28. A computer readable medium containing executable instructions which, when executed in a processing system, cause said system to perform a method for automated system identification comprising:
selecting a model structure;
generating at least one reference signal for input into a system;
retrieving a plurality of input signals and a plurality of output signals from said system;
performing system identification on said model structure using said plurality of input signals, said plurality of output signals, and said at least one reference signal to obtain a point model;
verifying accuracy of said point model;
said reference signal being generated to obtain maximum output signal-to-noise ratio and to guarantee a linear operation regime for said point model.

29. The computer readable medium according to claim 28, wherein said method further comprises:
automatically detecting at least one outlier value in said plurality of output signals; and
removing said at least one outlier value from said plurality of output signals.

30. The computer readable medium according to claim 28, wherein said performing further comprises identifying an input/output model and a disturbance model within said point model.

31. The computer readable medium according to claim 30, wherein said input/output model is unstable and said disturbance model is determined using said input/output model.

32. A computer readable medium containing executable instructions which, when executed in a processing system, cause said system to perform a method for automated system identification comprising:
selecting a model structure;

generating at least one reference signal for input into a system;

retrieving a plurality of input signals and a plurality of output signals from said system;

performing system identification on said model structure using said plurality of input signals, said plurality of output signals, and said at least one reference signal to obtain a point model;

verifying accuracy of said point model;

automatically detecting at least one outlier value in said plurality of output signals;

removing said at least one outlier value from said plurality of output signals; and replacing said at least one outlier value with a predetermined value calculated using a filter.

33. A computer readable medium containing executable instructions which, when executed in a processing system, cause said system to perform a method for automated system identification comprising:

selecting a model structure;

generating at least one reference signal for input into a system;

retrieving a plurality of input signals and a plurality of output signals from said system;

performing system identification on said model structure using said plurality of input signals, said plurality of output signals, and said at least one reference signal to obtain a point model;

verifying accuracy of said point model;

automatically detecting at least one outlier value in said plurality of output signals;

removing said at least one outlier value from said plurality of output signals; and said detecting further including:

building a filter using said plurality of input signals and said plurality of output signals, computing said at least one outlier value using said filter, comparing said at least one outlier value with a predetermined threshold value, and storing said at least one outlier value if said at least one outlier value is greater than said predetermined threshold value.

34. The computer readable medium according to claim 33, wherein said detecting requires a plurality of iterations, each iteration being related to a time value.

35. A computer readable medium containing executable instructions which, when executed in a processing system, cause said system to perform a method for automated system identification comprising:

selecting a model structure;

generating at least one reference signal for input into a system;

retrieving a plurality of input signals and a plurality of output signals from said system;

performing system identification on said model structure using said plurality of input signals, said plurality of output signals, and said at least one reference signal to obtain a point model;

verifying accuracy of said point model;

wherein said performing further comprises identifying an input/output model and a disturbance model within said point model; and calculating an input/output uncertainty parameter within said input/output model, and calculating a disturbance uncertainty parameter within said disturbance model.

36. The computer readable medium according to claim 35, wherein said verifying further comprises analyzing frequency regions corresponding to said input/output uncertainty parameter and said disturbance uncertainty parameter and modifying said at least one reference signal by increasing a sweep time corresponding to said frequency regions.

37. A computer readable medium containing executable instructions which, when executed in a processing system, cause said system to perform a method for automated system identification comprising:

selecting a model structure;

generating at least one reference signal for input into a system;

retrieving a plurality of input signals and a plurality of output signals from said system;

performing system identification on said model structure using said plurality of input signals, said plurality of output signals, and said at least one reference signal to obtain a point model; and verifying accuracy of said point model;

wherein said verifying further comprises analyzing whether a plurality of innovation signals, derived from said plurality of output signals, are white stochastic signals uncorrelated with past measurements.

38. A computer readable medium containing executable instructions which, when executed in a processing system, cause said system to perform a method for automated system identification comprising:

selecting a model structure;

generating at least one reference signal for input into a system;

retrieving a plurality of input signals and a plurality of output signals from said system;

performing system identification on said model structure using said plurality of input signals, said plurality of output signals, and said at least one reference signal to obtain a point model;

verifying accuracy of said point model;

calculating a cost vector for said model structure;

selecting a model order based on said cost vector associated with said model structure; and wherein said verifying further comprises analyzing said plurality of input signals and said plurality of output signals retrieved using a value of zero for said at least one reference signal and increasing said model order to account for unrepresented system dynamics.

39. An article of manufacture comprising a program storage medium readable by a computer and tangibly embodying at least one program of instructions executable by said computer to perform a method for automated system identification, said method comprising:

selecting a model structure;

generating at least one reference signal for input into a system;

retrieving a plurality of input signals and a plurality of output signals from said system;

performing system identification on said model structure using said plurality of input signals, said plurality of output signals, and said at least one reference signal to obtain a point model;

verifying accuracy of said point model;

calculating a cost vector for said model structure;
selecting a model order based on said cost vector associated with said model structure; and
said model structure including at least one model parameter.

40. The article of manufacture according to claim 39, wherein said method further comprises verifying linearity of said system and detecting non-linear manifestations of said system.

41. The article of manufacture, according to claim 39, wherein said method further comprises storing said at least one reference signal into a reference table and storing said plurality of input signals and said plurality of output signals into an input/output table.

42. The article of manufacture according to claim 39, wherein said model structure is selected from a group consisting of finite impulse response (FIR), autoregressive with external input (ARX), autoregressive moving average with external input (ARMAX), autoregressive moving average (ARMA), autoregressive autoregressive with external input (ARARX), autoregressive autoregressive moving average with external input (ARARMAX), output error (OE), Box-Jenkins (BJ), and Ordinary Differential Equations (ODE).

43. An article of manufacture comprising a program storage medium readable by a computer and tangibly embodying at least one program of instructions executable by said computer to perform a method for automated system identification, said method comprising:
selecting a model structure;
generating at least one reference signal for input into a system;
retrieving a plurality of input signals and a plurality of output signals from said system;
performing system identification on said model structure using said plurality of input signals, said plurality of output signals, and said at least one reference signal to obtain a point model;
verifying accuracy of said point model;
providing at least one operating condition for said system;
providing a sampling frequency and a frequency bandwidth covered by said model structure; and
defining a plurality of identification experiments according to said at least one operating condition, said sampling frequency, and said frequency bandwidth.

44. The article of manufacture according to claim 43, wherein said model structure includes a plurality of experimental parameters determined by said plurality of identification experiments.

45. The article of manufacture according to claim 43, wherein said method further comprises:
performing each identification experiment of said plurality of identification experiments in said system; and
obtaining said plurality of input signals and said plurality of output signals from said each identification experiment.

46. An article of manufacture comprising a program storage medium readable by a computer and tangibly embodying at least one program of instructions executable by said computer to perform a method for automated system identification, said method comprising:
selecting a model structure;
generating at least one reference signal for input into a system;
retrieving a plurality of input signals and a plurality of output signals from said system;
performing system identification on said model structure using said plurality of input signals, said plurality of output signals, and said at least one reference signal to obtain a point model;
verifying accuracy of said point model; and
said reference signal being selected from a group consisting of a chirp signal, a pseudo random binary sequence, a sum of sinusoids, and a wavelet.

47. The article of manufacture according to claim 46, wherein said method further comprises:
automatically detecting at least one outlier value in said plurality of output signals; and
removing said at least one outlier value from said plurality of output signals.

48. An article of manufacture comprising a program storage medium readable by a computer and tangibly embodying at least one program of instructions executable by said computer to perform a method for automated system identification, said method comprising:
selecting a model structure;
generating at least one reference signal for input into a system;
retrieving a plurality of input signals and a plurality of output signals from said system;
performing system identification on said model structure using said plurality of input signals, said plurality of output signals, and said at least one reference signal to obtain a point model;
verifying accuracy of said point model; and
said reference signal being generated to obtain maximum output signal-to-noise ratio and to guarantee a linear operation regime for said point model.

49. The article of manufacture according to claim 48, wherein said performing further comprises identifying an input/output model and a disturbance model within said point model.

50. The article of manufacture according to claim 49, wherein said input/output model is unstable and said disturbance model is determined using said input/output model.

51. The article of manufacture according to claim 49, wherein said method further comprises calculating an input/output uncertainty parameter within said input/output model, and calculating a disturbance uncertainty parameter within said disturbance model.

52. The article of manufacture according to claim 51, wherein said verifying further comprises analyzing frequency regions corresponding to said input/output uncertainty parameter and said disturbance uncertainty parameter and modifying said at least one reference signal by increasing a sweep time corresponding to said frequency regions.

53. An article of manufacture comprising a program storage medium readable by a computer and tangibly embodying at least one program of instructions executable by said computer to perform a method for automated system identification, said method comprising:
selecting a model structure;
generating at least one reference signal for input into a system;
retrieving a plurality of input signals and a plurality of output signals from said system;
performing system identification on said model structure using said plurality of input signals, said plurality of output signals, and said at least one reference signal to obtain a point model;
verifying accuracy of said point model;

automatically detecting at least one outlier value in said plurality of output signals;

removing said at least one outlier value from said plurality of output signals; and replacing said at least one outlier value with a predetermined value calculated using a filter.

54. An article of manufacture comprising a program storage medium readable by a computer and tangibly embodying at least one program of instructions executable by said computer to perform a method for automated system identification, said method comprising:

selecting a model structure;

generating at least one reference signal for input into a system;

retrieving a plurality of input signals and a plurality of output signals from said system;

performing system identification on said model structure using said plurality of input signals, said plurality of output signals, and said at least one reference signal to obtain a point model;

verifying accuracy of said point model;

automatically detecting at least one outlier value in said plurality of output signals;

removing said at least one outlier value from said plurality of output signals;

said detecting further including:

building a filter using said plurality of input signals and said plurality of output signals;

computing said at least one outlier value using said filter;

comparing said at least one outlier value with a predetermined threshold value; and storing said at least one outlier value if said at least one outlier value is greater than said predetermined threshold value.

55. The article of manufacture according to claim 54, wherein said detecting requires a plurality of iterations, each iteration being related to a time value.

56. An article of manufacture comprising a program storage medium readable by a computer and tangibly embodying at least one program of instructions executable by said computer to perform a method for automated system identification, said method comprising:

selecting a model structure;

generating at least one reference signal for input into a system;

retrieving a plurality of input signals and a plurality of output signals from said system;

performing system identification on said model structure using said plurality of input signals, said plurality of output signals, and said at least one reference signal to obtain a point model;

verifying accuracy of said point model;

said verifying further comprising analyzing whether a plurality of innovation signals, derived from said plurality of output signals, are white stochastic signals uncorrelated with past measurements.

57. An article of manufacture comprising a program storage medium readable by a computer and tangibly embodying at least one program of instructions executable by said computer to perform a method for automated system identification, said method comprising:

selecting a model structure;

generating at least one reference signal for input into a system;

retrieving a plurality of input signals and a plurality of output signals from said system;

performing system identification on said model structure using said plurality of input signals, said plurality of output signals, and said at least one reference signal to obtain a point model;

verifying accuracy of said point model;

calculating a cost vector for said model structure;

selecting a model order based on said cost vector associated with said model structure; and said verifying further comprising analyzing said plurality of input signals and said plurality of output signals retrieved using a value of zero for said at least one reference signal and increasing said model order to account for unrepresented system dynamics.

58. A method for automated system identification comprising:

qualifying a system;

performing an identification experiment procedure on said system to obtain a plurality of input signal values and a plurality of output signal values;

filtering said plurality of output signal values to obtain point model data;

validating a point model obtained using said point model data;

said qualifying further comprising:

calculating a cost vector associated with each model structure of a plurality of model structures for said system;

selecting one model structure based on said associated cost vector;

selecting a model order based on said one model structure and said associated cost vector; and said calculating further comprising calculating said cost vector as a function of a risk of local minima factor, characteristic to said system; a computational cost factor, characteristic to said model structure, and an equipment time factor related to a number of identification experiments necessary to obtain said point model.

59. A method for automated system identification comprising:

qualifying a system;

performing an identification experiment procedure on said system to obtain a plurality of input signal values and a plurality of output signal values;

filtering said plurality of output signal values to obtain point model data;

validating a point model obtained using said point model data;

said qualifying further comprising:

calculating a cost vector associated with each model structure of a plurality of model structures for said system;

selecting one model structure based on said associated cost vector;

selecting a model order based on said one model structure and said associated cost vector; and transmitting said cost vector to a real-time planner module for selection of said one model structure.

60. The method according to claim 59, wherein said qualifying further comprises:

performing at least one qualification test on said system; and calculating a qualification vector based on said at least on qualification test.

61. The method according to claim 60, wherein said performing said at least one qualification test further comprises:

injecting a first reference signal value into said system to obtain a first output signal value;

injecting a second reference signal value, obtained by scaling said first reference signal value by a predetermined factor, to obtain a second output signal value; and comparing said first output signal value to said second output signal value to verify linearity of said system and to detect non-linear manifestations of said system.

62. A method for automated system identification comprising:

qualifying a system;

performing an identification experiment procedure on said system to obtain a plurality of input signal values and a plurality of output signal values;

filtering said plurality of output signal values to obtain point model data;

validating a point model obtained using said point model data;

said qualifying further comprising:

calculating a cost vector associated with each model structure of a plurality of model structures for said system;

selecting one model structure based on said associated cost vector;

selecting a model order based on said one model structure and said associated cost vector; and transmitting said cost vector to a user for selection of said one model structure.

63. A method for automated system identification comprising:

qualifying a system;

performing an identification experiment procedure on said system to obtain a plurality of input signal values and a plurality of output signal values;

filtering said plurality of output signal values to obtain point model data;

validating a point model obtained using said point model data;

said qualifying further comprising:

calculating a cost vector associated with each model structure of a plurality of model structures for said system;

selecting one model structure based on said associated cost vector;

selecting a model order based on said one model structure and said associated cost vector; and transmitting said cost vector to a processing module for selection of said one model structure.

64. A method for automated system identification comprising:

qualifying a system;

performing an identification experiment procedure on said system to obtain a plurality of input signal values and a plurality of output signal values;

filtering said plurality of output signal values to obtain point model data;

validating a point model obtained using said point model data;

said qualifying further comprising:

calculating a cost vector associated with each model structure of a plurality of model structures for said system;

selecting one model structure based on said associated cost vector;

selecting a model order based on said one model structure and said associated cost vector; and said one model structure selected further including at least one model parameter.

65. The method according to claim 64, wherein said model structure is selected from a group consisting of finite impulse response (FIR), autoregressive with external input (ARX), autoregressive moving average with external input (ARMAX), autoregressive moving average (ARMA), autoregressive autoregressive with external input (ARARX), autoregressive autoregressive moving average with external input (ARARMAX), output error (OE), Box-Jenkins (BJ), and Ordinary Differential Equations (ODE).

66. The method according to claim 64, wherein said filtering further comprises:

automatically detecting at least one outlier value in said plurality of output signal values; and removing said at least one outlier value from said plurality of output signal values.

67. The method according to claim 64, further comprising performing an identification on said point model.

68. The method according to claim 67, wherein said performing of said identification further comprises:

identifying an input/output model within said point model, said input/output model being characterized by an input/output transfer function;

identifying a disturbance model within said point model, said disturbance model being characterized by a disturbance transfer function;

assessing stability of said input/output model; and calculating said disturbance transfer function based on said stability of said input/output model.

69. The method according to claim 68, wherein said input/output model is unstable and said calculating further comprises:

processing said input/output transfer function to obtain at least two stable transfer functions;

calculating a prediction error associated with said system based on said at least two stable transfer functions; and calculating said disturbance transfer function using said prediction error and said at least two stable transfer functions for a predetermined model structure.

70. The method according to claim 69, wherein said predetermined model structure is selected from a group consisting of finite impulse response (FIR), autoregressive with external input (ARX), autoregressive moving average with external input (ARMAX), autoregressive moving average (ARMA), autoregressive autoregressive with external input (ARARX), autoregressive autoregressive moving average with external input (ARARMAX), output error (OE), Box-Jenkins (BJ), and Ordinary Differential Equations (ODE).

71. A method for automated system identification comprising:

qualifying a system;

performing an identification experiment procedure on said system to obtain a plurality of input signal values and a plurality of output signal values;

filtering said plurality of output signal values to obtain point model data;

validating a point model obtained using said point model data;

said qualifying further comprising:
- calculating a cost vector associated with each model structure of a plurality of model structures for said system;
- selecting one model structure based on said associated cost vector;
- selecting a model order based on said one model structure and said associated cost vector; and
- providing at least one operating condition for said system;
- providing a sampling frequency and a frequency bandwidth covered by said one model structure selected; and
- defining a plurality of identification experiments according to said at least one operating condition, said sampling frequency, and said frequency bandwidth.

72. The method according to claim 71, wherein said one model structure selected further includes at least one experimental parameter determined by said plurality of identification experiments.

73. The method according to claim 71, wherein said performing further comprises:
- generating at least one reference signal value for input into said system;
- performing each identification experiment of said plurality of identification experiments in said system using said at least one reference signal value; and
- obtaining said plurality of input signal values and said plurality of output signal values from said each identification experiment performed.

74. The method according to claim 73, wherein said performing further comprises storing said plurality of input signal values into an input storage device and said plurality of output signal values into an output storage device.

75. The method according to claim 74, wherein said generating further comprises:
- retrieving one output signal value from said output storage device;
- dividing said one output signal value by said at least one reference signal value to obtain an input/output gain; and
- dividing a predetermined output signal level by the input/output gain to obtain a new reference signal value.

76. The method according to claim 73, wherein said generating said at least one reference signal value is based on at least one model parameter associated with said model structure and at least one experimental parameter associated with said model structure and determined by said plurality of identification experiments.

77. The method according to claim 73, wherein said generating said at least one reference signal value produces maximum output signal-to-noise ratio and guarantees a linear operation regime for said point model.

78. The method according to claim 73, wherein said at least one reference signal includes at least one signal selected from a group consisting of a chirp signal, a pseudo random binary sequence, a sum of sinusoids, and a wavelet.

79. The method according to claim 73, wherein said performing further comprises storing said at least one reference signal value into a reference storage device.

80. The method according to claim 73, wherein said generating is iterative, being performed repetitively for each identification experiment of said plurality of identification experiments.

81. A method for automated system identification comprising:
- qualifying a system;
- performing an identification experiment procedure on said system to obtain a plurality of input signal values and a plurality of output signal values;
- filtering said plurality of output signal values to obtain point model data;
- validating a point model obtained using said point model data;
- said qualifying further comprising:
  - performing at least one qualification test on said system, and
  - calculating a qualification vector based on said at least on qualification test; and
- deciding whether said system is qualified based on results from said at least one qualification test and terminating said qualifying if said results are outside of a predetermined range.

82. A method for automated system identification comprising:
- qualifying a system;
- performing an identification experiment procedure on said system to obtain a plurality of input signal values and a plurality of output signal values;
- filtering said plurality of output signal values to obtain point model data;
- validating a point model obtained using said point model data;
- said filtering further comprising:
  - automatically detecting at least one outlier value in said plurality of output signal values, and
  - removing said at least one outlier value from said plurality of output signal values; and
- said detecting further comprising:
  - constructing a filter using said plurality of input signal values and said plurality of output signal values,
  - computing said at least one outlier value as a difference between a predetermined output signal value corresponding to said filter and one output signal value of said plurality of output signal values,
  - comparing said at least one outlier value with a predetermined threshold error value, and
  - storing said at least one outlier value if said at least one outlier value is greater than said predetermined threshold value.

83. The method according to claim 82, wherein said filtering further comprises replacing said at least one outlier value with said predetermined output signal value calculated using said filter.

84. The method according to claim 82, wherein said comparing is automatically performed by a real-time planner.

85. The method according to claim 82, wherein said comparing is performed by a user.

86. The method according to claim 82, wherein said comparing is automatically performed by a processing module.

87. A method for automated system identification comprising:
- qualifying a system;
- performing an identification experiment procedure on said system to obtain a plurality of input signal values and a plurality of output signal values;
- filtering said plurality of output signal values to obtain point model data;
- validating a point model obtained using said point model data;
- said filtering further comprising:
  - automatically detecting at least one outlier value in said plurality of output signal values, and
  - removing said at least one outlier value from said plurality of output signal values; and
- wherein said detecting is iterative, being performed repetitively for a plurality of time values if said at least one outlier value is lower than a predetermined threshold value.

88. A method for automated system identification comprising:
- qualifying a system;
- performing an identification experiment procedure on said system to obtain a plurality of input signal values and a plurality of output signal values;
- filtering said plurality of output signal values to obtain point model data;
- validating a point model obtained using said point model data;
- said filtering further comprising:
  - automatically detecting at least one outlier value in said plurality of output signal values, and
  - removing said at least one outlier value from said plurality of output signal values;
- removing said plurality of output signal values if said at least one outlier value being removed exceeds a predetermined percentage of said plurality of output signal values; and
- iteratively performing said identification experiment procedure and said filtering to obtain new point model data.

89. A method for automated system identification comprising:
- qualifying a system;
- performing an identification experiment procedure on said system to obtain a plurality of input signal values and a plurality of output signal values;
- filtering said plurality of output signal values to obtain point model data;
- validating a point model obtained using said point model data;
- said validating further comprising:
  - analyzing whether a plurality of innovation signal values, derived from said plurality of output signal values, correspond to a plurality of white stochastic signal values; and
  - iteratively performing said identification experiment procedure and said filtering to obtain new point model data if said plurality of innovation signal values do not correspond to said plurality of white stochastic signal values.

90. A method for automated system identification comprising:
- qualifying a system;
- performing an identification experiment procedure on said system to obtain a plurality of input signal values and a plurality of output signal values;
- filtering said plurality of output signal values to obtain point model data;
- validating a point model obtained using said point model data; and
- said validating further comprising:
  - generating at least one reference signal value for input into said system;
  - analyzing said plurality of input signal values and said plurality of output signal values retrieved using a zero value for said at least one reference signal value;
  - calculating output spectral estimates for said plurality of output signal values;
  - calculating input spectral estimates for said plurality of input signal values;
  - calculating a transfer function estimate as a ratio of said output spectral estimates and said input spectral estimates;
  - comparing said transfer function estimate with said point model data; and
  - iteratively performing said identification experiment procedure and said filtering to obtain new point model data if features of said output spectral estimates and said input spectral estimates are not present in said pont model data.

91. A method for qualification of a system comprising:
- calculating a cost vector associated with each model structure of a plurality of model structures for said system;
- selecting one model structure based on said associated cost vector;
- selecting a model order based on said one model structure and said associated cost vector;
- said calculating further comprising:
- calculating said cost vector as a function of a risk of local minima factor, characteristic to said system;
- calculating a computational cost factor, characteristic to said model structure, and
- calculating an equipment time factor related to a number of identification experiments necessary to obtain said point model.

92. A method for qualification of a system comprising:
- calculating a cost vector associated with each model structure of a plurality of model structures for said system;
- selecting one model structure based on said associated cost vector;
- selecting a model order based on said one model structure and said associated cost vector; and
- transmitting said cost vector to a real-time planner module for selection of said one model structure.

93. The method according to claim 92, further comprising transmitting said cost vector to a user for selection of said one model structure.

94. A method for qualification of a system comprising:
- calculating a cost vector associated with each model structure of a plurality of model structures for said system;

selecting one model structure based on said associated cost vector;

selecting a model order based on said one model structure and said associated cost vector; and transmitting said cost vector to a processing module for selection of said one model structure.

95. The method according to claim 94, wherein said one model structure selected further includes at least one model parameter.

96. The method according to claim 94, further comprising:

providing at least one operating condition for said system;

providing a sampling frequency and a frequency bandwidth covered by said one model structure selected; and defining a plurality of identification experiments according to said at least one operating condition, said sampling frequency, and said frequency bandwidth.

97. A method for qualification of a system comprising:

calculating a cost vector associated with each model structure of a plurality of model structures for said system;

selecting one model structure based on said associated cost vector;

selecting a model order based on said one model structure and said associated cost vector;

providing at least one operating condition for said system;

providing a sampling frequency and a frequency bandwidth covered by said one model structure selected; and defining a plurality of identification experiments according to said at least one operating condition, said sampling frequency, and said frequency bandwidth; and said one model structure selected further including at least one experimental parameter determined by said plurality of identification experiments.

98. A method for qualification of a system comprising:

calculating a cost vector associated with each model structure of a plurality of model structures for said system;

selecting one model structure based on said associated cost vector;

selecting a model order based on said one model structure and said associated cost vector;

performing at least one qualification test on said system; and calculating a qualification vector based on said at lest one qualification test.

99. The method according to claim 98, wherein said performing said at least one qualification test further comprises:

injecting a first reference signal value into said system to obtain a first output signal value;

injecting a second reference signal value, obtained by scaling said first reference signal value by a predetermined factor, to obtain a second output signal value; and comparing said first output signal value to said second output signal value to verify linearity of said system and to detect non-linear manifestations of said system.

100. the method according to claim 98, wherein said model structure is selected from a group consisting of finite impulse response (FIR), autoregressive with external input (ARX), autoregressive moving average with external input (ARMAX), autoregressive moving average (ARMA), autoregressive autoregressive with external input (ARARX), autoregressive autoregressive moving average with external input (ARARMAX), output error (OE), Box-Jenkins (BJ), and Ordinary Differential Equations (ODE).

101. The method according to claim 98, further comprising deciding whether said system is qualified based on results from said at least one qualification test and terminating said qualifying if said results are outside of a predetermined range.

102. A method for filtering a plurality of output signal values obtained for a system comprising:

automatically detecting at least one outlier value in said plurality of output signal values; and removing said at least one outlier value from said plurality of output signal values;

constructing a filter using a plurality of input signal values and said plurality of output signal values;

computing said at least one outlier value as a difference between a predetermined output signal value corresponding to said filter and one output signal value of said plurality of output signal values;

comparing said at least one outlier value with a predetermined threshold error value;

storing said at least one outlier value if said at least one outlier value is greater than said predetermined threshold value; and replacing said at least one outlier value with said predetermined output signal value calculated using said filter.

103. The method according to claim 102, wherein said detecting is iterative, being performed repetitively for a plurality of time values if said at least one outlier value is lower than a predetermined threshold value.

104. The method according to claim 102, further comprising:

removing said plurality of output signal values if said at least one outlier value being removed exceeds a predetermined percentage of said plurality of output signal values; and providing a second plurality of output signal values for further processing.

105. A method for filtering a plurality of output signal values obtained for a system comprising:

automatically detecting at least one outlier value in said plurality of output signal values;

removing said at least one outlier value from said plurality of output signal values;

constructing a filter using a plurality of input signal values and said plurality of output signal values;

computing said at least one outlier value as a difference between a predetermined output signal value corresponding to said filter and one output signal value of said plurality of output signal values;

comparing said at least one outlier value with a predetermined threshold error value wherein, said comparing is automatically performed by a real-time planner; and storing said at least one outlier value if said at least one outlier value is greater than said predetermined threshold value.

106. The method according to claim 105, wherein said comparing is performed by a user.

107. The method according to claim 105, wherein said comparing is automatically performed by a processing module.

108. A method for validating a point model obtained for a system comprising:

generating at least one reference signal value for input into said system;

performing at least one identification experiment in said system using said at least one reference signal value;

obtaining a plurality of input signal values and a plurality of output signal values from said at least one identification experiment performed;

analyzing a plurality of innovation signal values, derived from said plurality of output signal values;

validating accuracy of said point model if said plurality of innovation signal values corresponds to a plurality of white stochastic signal values;

analyzing said plurality of input signal values and said plurality of output signal values retrieved using a zero value for said at least one reference signal value;

calculating output spectral estimates for said plurality of output signal values;

calculating input spectral estimates for said plurality of input signal values; and calculating a transfer function estimate as a ratio fo said output spectral estimates and said input spectral estimates;

comparing said transfer function estimate with said point model; and validating accuracy of said point model if features of said output spectral estimates and said input spectral estimates are present in said point model.

* * * * *

UNITED STATES PATENT AND TRADEMARK OFFICE
CERTIFICATE OF CORRECTION

| | |
|---|---|
| PATENT NO. | : 6,947,876 B1 |
| APPLICATION NO. | : 09/523065 |
| DATED | : September 20, 2005 |
| INVENTOR(S) | : Cecilia Galarza, Dan Hernandez and Mark Erickson |

It is certified that error appears in the above-identified patent and that said Letters Patent is hereby corrected as shown below:

Title Page 1, OTHER PUBLICATIONS, Column 2, reads "Arnold Buss, "System Identification Using Frequency Domain Methodolgy", Proceedings of the 1990 Winter Simulation Conference, pp. 360-363.*" and should read -- Arnold Buss, "System Identification Using Frequency Domain Methodology", Proceedings of the 1990 Winter Simulation Conference, pp. 360-363.* -- .

Column 2, line 21 reads "FIG. 1 shows an exemplary dosed loop data acquisition…" and should read -- FIG. 1 shows an exemplary closed loop data acquisition… --.

Column 3, line 29 reads "…EEPROMS, magnetic or optical cards, or any type of media…" and should read -- …EEPROMS, magnetic or optical cards, or any type of media… --.

Column 4, line 3 reads "…invention is described in connection with dosed loop system …" and should read -- …invention is described in connection with closed loop system … --.

Column 4, line 6 reads "However, dosed loop system identification should be used…" and should read -- However closed loop system identification should be used… --.

Column 5, line 52 reads "…loop identification illustrated at in FIG. 1, the test may verify…" and should read -- …loop identification illustrated in FIG. 1, the test may verify… --.

Column 10, line 18 reads, "…based on $G_u$ and $G_s$. His then obtained considering an AR…" and should read -- "…based on $G_u$ and $G_s$. H is then obtained considering an AR… --.

Column 12, Claim 3, line 28 reads, "3. the method according to claim 2, wherein said model…" and should read -- 3. The method according to claim 2, wherein said model… --.

Column 12, Claim 4, line 31 reads, "…verifying linearity of said system and detecting no=linear …" and should read -- …verifying linearity of said system and detecting non-linear …--.

Column 13, Claim 13, line 36 reads, "…removing said at least one outlier value fro said plurality…" and should read -- …removing said at least one outlier value from said plurality… --.

UNITED STATES PATENT AND TRADEMARK OFFICE
CERTIFICATE OF CORRECTION

| | |
|---|---|
| PATENT NO. | : 6,947,876 B1 |
| APPLICATION NO. | : 09/523065 |
| DATED | : September 20, 2005 |
| INVENTOR(S) | : Cecilia Galarza, Dan Hernandez and Mark Erickson |

It is certified that error appears in the above-identified patent and that said Letters Patent is hereby corrected as shown below:

Column 13, line 14, line 56 reads, "...removing said at least one outlier value fro said plurality..." and should read -- ...removing said at least one outlier value from said plurality... --.

Column 19, Claim 41, line 10 reads, "41. The article of manufacture, according to claim 39,..." and should read -- 41. The article of manufacture according to claim 39,... --.

Column 22, Claim 58, line 40 reads, "...characteristic to said system; a computational cost..." and should read -- ...characteristic to said system, a computational cost... --.

Column 23, Claim 60, lines 5-6 read, "...calculating a qualification vector based on said at least on qualification test." and should read -- ...calculating a qualification vector based on said at least one qualification test.--.

Column 28, Claim 90, line 32 reads, "...present in said pont model data." and should read -- ...present in said point model data.--.

Column 28, Claim 91, line 44 reads, "...minima factor, characteristic to said system;" and should read -- ...minima factor, characteristic to said system, --.

Column 29, Claim 98, lines 51-52 read, "...calculating a qualification vector based on said at lest one qualification test." and should read -- ...calculating a qualification vector based on at least one qualification test.--.

Column 29, Claim 100, line 65 reads, "100. the method according to claim 98, wherein said..." and should read -- 100. The method according to claim 98, wherein said... --.

Column 30, Claim 105, line 61 reads, "...mined threshold error value wherein, said comparing is..." and should read -- ...mined threshold error value wherein, said comparing is... --.

UNITED STATES PATENT AND TRADEMARK OFFICE
CERTIFICATE OF CORRECTION

PATENT NO. : 6,947,876 B1
APPLICATION NO. : 09/523065
DATED : September 20, 2005
INVENTOR(S) : Cecilia Galarza, Dan Hernandez and Mark Erickson It is certified that error appears in the above-identified patent and that said Letters Patent is hereby corrected as shown below:

Column 32, Claim 108, line 8 reads, "...calculating a transfer function estimate as a ratio fo said..." and should read -- ...calculating a transfer function estimate as a ratio of said... --.

Signed and Sealed this

Twenty-second Day of August, 2006

JON W. DUDAS
*Director of the United States Patent and Trademark Office*